July 19, 1960     J. C. TRAVILLA ET AL     2,945,456
RAILWAY MOTOR TRUCKS

Filed April 28, 1958     3 Sheets-Sheet 1

INVENTORS.
JAMES C. TRAVILLA &
JULIUS J. ZACH
BY
*Francis T. Burgess*
ATTORNEY

July 19, 1960   J. C. TRAVILLA ET AL   2,945,456
RAILWAY MOTOR TRUCKS

Filed April 28, 1958   3 Sheets-Sheet 2

INVENTORS
JAMES C. TRAVILLA &
JULIUS J. ZACH
BY
*Francis T. Burgess*
ATTORNEY

July 19, 1960  J. C. TRAVILLA ET AL  2,945,456
RAILWAY MOTOR TRUCKS

Filed April 28, 1958  3 Sheets-Sheet 3

INVENTORS
JAMES C. TRAVILLA &
JULIUS J. ZACH
BY
*Francis T. Burgess*
ATTORNEY

United States Patent Office 2,945,456
Patented July 19, 1960

2,945,456

RAILWAY MOTOR TRUCKS

James C. Travilla, Ladue, and Julius J. Zach, St. Louis, Mo., assignors to General Steel Castings Corporation, Granite City, Ill., a corporation of Delaware Filed Apr. 28, 1958, Ser. No. 731,514

9 Claims. (Cl. 105—188)

The invention relates to railway trucks and consists particularly in a six-wheel motor truck having a novel bolster and frame arrangement.

In the usual six-wheel swing motion motor truck having motorized axles at each end with the motors suspended from transoms between the end axles and the middle axle, a relatively long wheel base is required to accommodate the bolster-supporting swing hangers and the suspension of the motor noses from the sides of the transoms adjacent the motorized axles and at the same time to provide adequate clearance between the opposite sides of the intermediate transoms and the middle wheels. Because of the restricted transverse spacing between the frame side members of narrow gauge trucks, the situation is aggravated in that the motors and gear boxes necessarily occupy almost the entire distance between the inner surfaces of the wheels.

It accordingly is a principal object of the invention to provide a six-wheel swing motion motor truck having a minimum wheel base and at the same time provide adequate space for motors on the end axles.

It is a further object to provide a swing motion truck in which vertical separation between the bolster and the frame is prevented.

It is an additional object to so locate the swing hangers, in a truck of this type, that adequate swinging movement is permitted without interference with brake rigging or adjacent wheels.

We accomplish these and additional more detailed objects by forming the intermediate transoms with their middle motor nose-supporting portions offset longitudinally of the truck away from the motorized axles, that is toward the center of the truck. The ends of the bolster, which is received within the frame between the transoms, are correspondingly offset longitudinally of the truck and end portions of the bolster cross arms extend beneath the end portions of the transoms, from which they are each supported by a single swing hanger.

Figure 1:
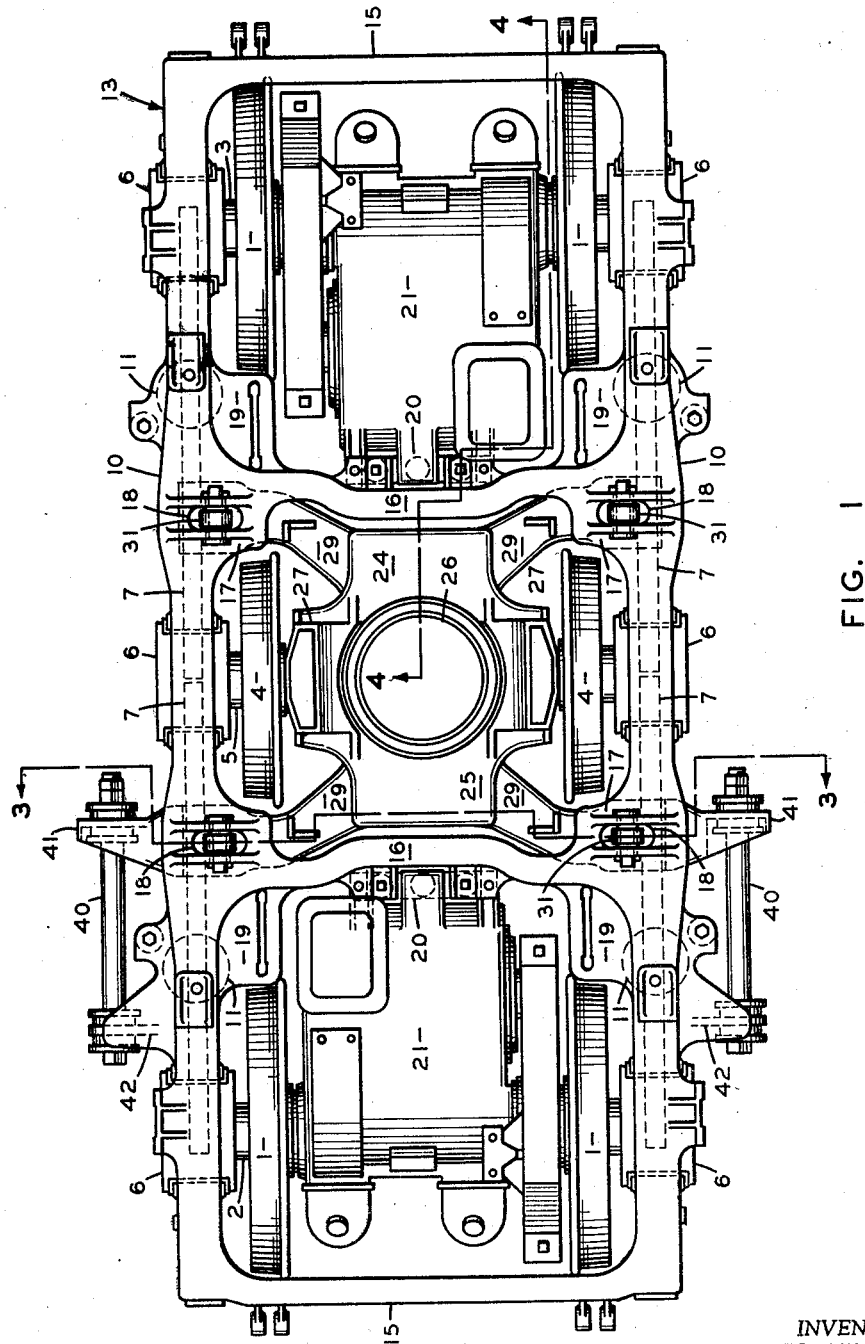
Figure 1 is a top view of a truck embodying the invention.
Figure 2:
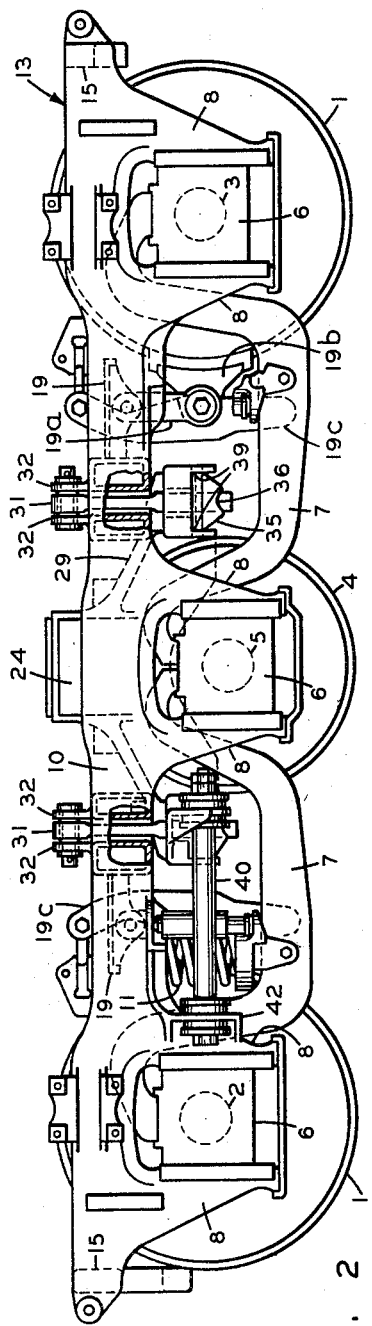
Figure 2 is a side elevation view of the same truck.
Figure 3:
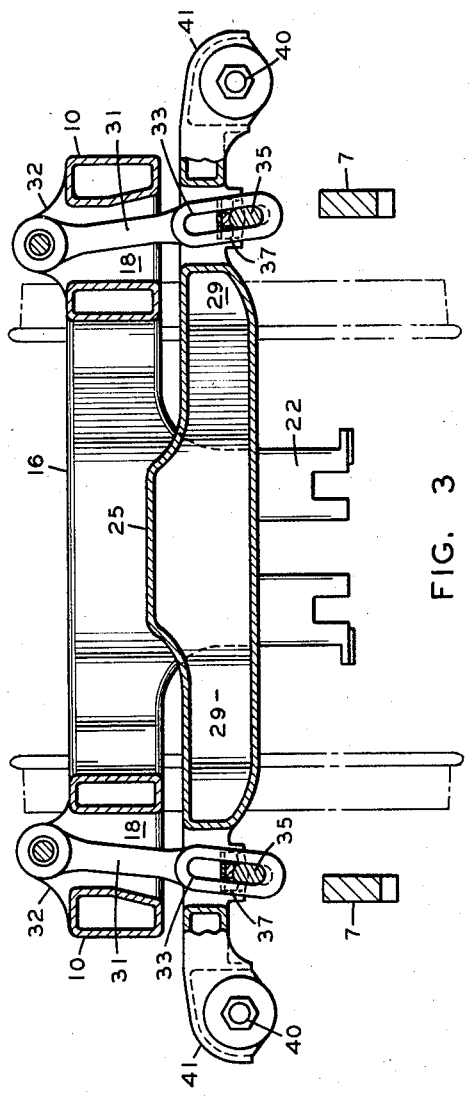
Figure 3 is a transverse vertical sectional view along the line 3—3 of Figure 1.
Figure 4:
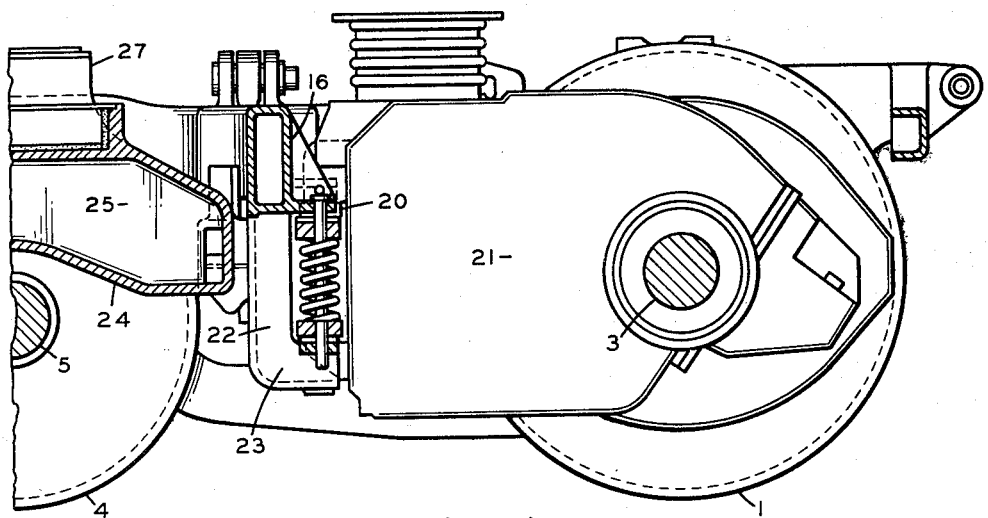
Figure 4 is a partial longitudinal vertical sectional view along the line 4—4 of Figure 1.

The truck illustrated in the drawings comprises relatively large wheels 1 mounted on end axles 2 and 3 and smaller wheels 4 mounted on middle axle 5. Journal boxes 6 rotatably mounted on the ends of axles 2, 3, and 5 support the ends of drop equalizers 7, and are slideably received, respectively, between paired pedestal legs 8 depending from truck frame side members 10, which in turn are spring-supported by means of coil springs 11 on equalizers 7. To provide proper load distribution to the wheels, springs 11, are located, as is customary, closer to the end axles than to the middle axle, or at the end of the drop portion of the equalizers nearest the end axles.

The truck frame, generally indicated at 13, comprises longitudinally extending side members 10, transverse end transoms 15, 15 and transverse intermediate transoms 16, 16. Intermediate transoms 16 intersect the longitudinally extending side members 10 between the middle axle and each of the end axles, the intersection being spaced longitudinally of the truck toward the middle axle from springs 11. The end portions of transoms 16, adjust their intersection with frame side members 10 are widened longitudinally of the truck toward the middle axle as at 17, to accommodate a vertical aperture 18 through each of the widened portions at that point, the surface of the end portions facing the end axles being as close to the end axles as is permitted by the requirement for clearance between brake hanger brackets 19 and the end axle wheels 1. Brake hangers 19a, pivotally supported from each of the brackets 19, support, at their lower ends brake heads 19b and associated shoes; live levers 19c are pivotally connected to brake heads 19b and are operatively connected at their upper and lower end, respectively, with a cylinder-lever and bottom connecting rod (not shown).

To provide adequate space longitudinally of the truck to accommodate the supports for noses 20 of end axle motors 21 (which are supported at their other ends on end axles 2 and 3 respectively), the middle portions of the intermediate transoms 16 are offset longitudinally of the truck away from the end axles. Transoms 16 are at the same height and are of the same depth as the side members except for their middle portions 22 which are of greater depth, as at 23, to provide necessary support for the associated motor noses 20.

Between intermediate transoms 16, a bolster 24 is supported from the frame. Bolster 24 consists of a subsantially rectangular longitudinally extending central member 25 formed with an upright cylindrical body-supporting center plate of usual construction and provided with transversely extending side bearing arms 27. Central member 25 slopes downwardly forwardly and rearwardly of the center plate, and terminates, longitudinally of the truck, in transversely projecting arms 29 which are offset toward the middle axle a sufficient amount to prevent interference between the bolster and the depending part of the intermediate transoms 16 throughout the permissible lateral movement of the bolster. The ends of bolster arms 29 extend beneath the widened end portions 17 of transoms 16 and the adjacent portions of the frame side members. Swing hangers 31 pivotally supported from upstanding ears 32 on either side of the frame apertures 18, and extending downwardly through the frame apertures, support the bolster for limited movement transversely of the frame.

The pivotal mountings of the swing hangers in ears 32 are well outboard of the wheels, and the hangers are slightly inclined downwardly and outwardly from their supports, their lower ends terminating a short distance directly above the equalizers. This location of the hangers transversely of the truck permits them to be located longitudinally of the truck very close to the middle wheels 4, without liklihood of interference. This in turn permits the hangers to be spaced a substantial distance longitudinally of the truck from the equalizer springs 11 whereby to permit ample space between the truck frame side members, the equalizers, the bolster ends, and the equalizer springs, for inspection of brake rigging 19a, 19b, 19c and for replacement of brake parts.

Swing hangers 31 are formed with the usual elongated slot 33 in their lower end portions. A short key 35 upwardly recessed intermediate its ends as at 36 for engagement with the lower end of the slot 33, is carried thereby and pivotally supports a short bearing member 37 having an upwardly concave lower surface engageable with and seated on the upper convex surface of key 35.

Bearing member 37 is formed with a narrow neck intermediate its ends and passing through the slot 33 of swing hanger 31, the widened end portions of bearing 37 being seated in downwardly open pockets 39 adjacent the sides of the bolster apertures.

This construction enables the swing hangers to be replaced merely by jacking the bolster, rotating bearings 37 into alignment with slot 33 and the swing hanger, and removing the bearing. Key 35 may be removed from the swing hanger merely by raising it sufficiently that its lower portions on either side of the recess 36 clear the bottom of the slot, and removing it longitudinally of the truck. The swing hanger may be removed from the frame by removing its upper pivot pin. Replacing of the hangers may be accomplished by taking the same steps in reverse order.

This bolster arrangement, in addition to eliminating extra swing hangers, and providing a very simple means for removing and replacing swing hangers also provides a positive means for preventing vertical separation of the bolster and the truck frame in that the end portions of the bolster underlie the end portions of the transom and associated parts of the frame side members.

Relative longitudinal movement between the bolster and the frame is prevented by a pair of longitudinally extending anchor rods 40 each of which is connected at one end to bracket structure 41 extending outwardly from one of the bolster arms 29, and at the other end to transversely outwardly extending brackets 42 on one of the truck frame pedestals 8, the connections between the ends of anchor rod 40 and brackets 41 and 42, and the construction of the anchor rod itself, being as described in Reissue Patent 21,987.

It will be evident from the foregoing description that the novel bolster suspension provides the shortest possible wheel base consistent with a swing motion bolster while at the same time accommodating necessary lateral motion without interference between the bolster and the associated offset intermediate transom structure.

These and other advantages attained upon the construction and associated with the attainment of the objectives set forth in the introductory portion of the specification may be embodied in structure differing in details from those illustrated, and the exclusive use of such modifications as come within the scope of the appended claims is contemplated.

What is claimed is:

1. A railway vehicle truck comprising three wheel and axle assemblies, a frame supported therefrom and including longitudinally-extending side members laterally outboard of the wheels and a single transverse transom connecting said side members between the middle assembly and each end assembly, a bolster including a central member having at its ends a pair of transverse arms, the middle portions of said arms being spaced longitudinally of the truck from said transoms and the end portions of said arms underlying the ends of said transoms and adjacent portions of said side members, swing hangers supported from said frame at the intersection of said transoms and said side members and outboard of the wheels and inboard of the side members, the end portions of each of said bolster arms being supported from the frame by said swing hangers for lateral movement relative to the frame.

2. A railway vehicle truck comprising three wheel and axle assemblies, longitudinal drop equalizers extending between adjacent assemblies and supported from the ends thereof laterally outboard of the wheels, upright springs seated on the drop portions of said equalizers adjacent said end assemblies, a frame including longitudinally-extending side members substantially vertically aligned with said equalizers and supported on said springs and a single transverse transom connecting said side members between the middle assembly and each end assembly, a bolster including a central member having at its ends a pair of transverse arms, the middle portions of said arms being spaced longitudinally of the truck from said transoms and the end portions of said arms terminating laterally outboard of the wheels and underlying the ends of said transoms and adjacent portions of said side members, the intersections of said transoms and said side members being spaced longitudinally of the truck from said springs, swing hangers supported from said frame at the intersection of said transoms and said side members and being positioned outboard of the wheels and inboard of the frame and being adapted to swing over said equalizers, the end portions of said bolster arms being supported from the frame by said swing hangers for lateral movement relative to said frame.

3. A railway vehicle truck according to claim 2 in which the lower ends of said hangers are at a higher level than the upper surface of said equalizer drop portions.

4. A railway vehicle truck according to claim 3 in which the lower ends of said swing hangers are normally positioned directly above said equalizer drop portions.

5. A railway vehicle truck comprising three wheel and axle assemblies, a frame supported therefrom and including longitudinally-extending side members laterally outboard of the wheels and a single transverse transom connecting said side members between the middle assembly and each end assembly, the middle portions of said transoms being offset longitudinally of the truck toward the middle axle and the end portions of the transoms being widened longitudinally of the truck toward the middle axle, the middle portions of said transoms being deepened to form a motor support, motors carried by said end axles and by the deepened middle portion of said transoms and partially occupying the space provided by the offset middle portions of said transoms, a bolster including a central member overlying the middle axle intermediate the wheels and having at its ends a pair of transverse arms, the middle portions of said arms being offset longitudinally of the truck from the end portions of said arms and being spaced longitudinally of the truck from the middle portions of said transoms, the end portions of said arms underlying the widened end portions of said transoms and being in substantial transverse alignment with the middle portions of said transoms, substantially vertically aligned apertures in said bolster arms and the widened end portions of said transoms laterally outboard of the wheels and inboard of the side members, a swing hanger supported from said frame and extending through each pair of aligned apertures, and means carried by said swing hangers to support said bolster arms therefrom for movement laterally of said truck frame.

6. Structure according to claim 5 in which said hangers are formed with elongated slots in their lower ends, there being a key passing through each said slot and notched intermediate its ends for seating on the lower end of said slot, the end portions of said key at either side of said hanger underlying the lower surface of said bolster arms at either side of said aperture, said bolster arms being supported from said key.

7. Structure according to claim 6 in which the upper surface of said key has a convex surface, there being a bearing member having a lower concave surface frictionally engageable with said upper convex surface and a substantially flat upper surface engageable with a corresponding downward surface on the associated bolster arm, a portion of said key intermediate its ends being narrowed to adapt its insertion in the swing hanger slot.

8. A railway vehicle truck comprising three wheel and axle assemblies, longitudinal equalizers extending between adjacent assemblies and supported from the ends thereof, springs on said equalizers, a frame supported from said springs and including longitudinally-extending side members laterally outboard of the wheels and a single transverse transom connecting said side members between the middle assembly and each end assembly, the middle portions of said transoms being offset longitudinally of said truck from the end portions away from the adjacent end assemblies and being deepened to form motor supports, the end portions of said transoms being widened longitudinally of the truck toward the middle axle, traction motors supported from said end assemblies and the deepened middle portions of the adjacent transoms and occupying the space bounded by the offset middle portions of said transoms, a bolster including a central member overlying the middle axle and having at its ends a pair of transverse arms, the middle portions of said arms being offset longitudinally of the truck toward the middle axle from the end portions of said arms and spaced longitudinally of the truck from the middle portion of said adjacent transoms, the end portion of said arms underlying the widened end portions of said transoms and being in substantial transverse alignment with the middle portions of said transoms, the end portions of both said arms terminating laterally outwardly of the wheels and the end portions of at least one of said arms terminating laterally outwardly of said frame side members, rods extending longitudinally of the truck and resiliently connected at their one end to said arms and at their other end to said frame side members outboard thereof for accommodating lateral movements of said bolster while restraining longitudinal movements and transmitting draft forces from said truck frame to said bolster, substantially vertically-aligned apertures laterally outboard of the wheels in the frame portion formed by the widened end portions of said transoms and the adjacent frame side members and in the underlying end portions of said bolster arms, a pair of upstanding ears on said frame adjacent the sides of each said aperture, a swing hanger pivotally supported from each pair of said ears and extending downwardly therefrom through said aligned apertures, means supported by the lower end portions of each said swing hanger and underlyingly supporting adjacent portions of the bolster.

9. A device for supporting a railway truck bolster comprising an elongated hanger arranged for pivotal connection to a truck part at its upper end and having an elongated slot in its lower end, a flat key passing through said slot, the lower surface of said key intermediate its ends being notched for seating on the lower end of said slot, the upper surface of said key being of convex transverse section, a bearing comprising an elongated plate having a concave lower surface adapted to rest on the upper surface of said key, the intermediate portion of said bearing being narrowed transversely to accommodate its insertion through said slot, the end portions of said bearing being wider than said slot whereby to prevent accidental removal of said bearing from said slot and to provide seats for downwardly facing surfaces of the supported bolster.

References Cited in the file of this patent

UNITED STATES PATENTS

| | | |
|---|---|---|
| 1,948,250 | Wintemberg | Feb. 20, 1934 |
| 2,074,299 | Blunt | Mar. 16, 1937 |
| 2,164,444 | Blomberg | July 4, 1939 |
| 2,184,648 | Pagenkemper | Dec. 26, 1939 |
| 2,389,521 | Leppla | Nov. 20, 1945 |
| 2,841,095 | Travilla et al. | July 1, 1958 |